H. H. ARMSTRONG.
AUTOGENOUS CUTTING TORCH.
APPLICATION FILED DEC. 1, 1915.

1,300,106.

Patented Apr. 8, 1919.

Inventor:
HARRY H. ARMSTRONG,
His Attorney.

UNITED STATES PATENT OFFICE.

HARRY H. ARMSTRONG, OF CHICAGO, ILLINOIS, ASSIGNOR TO FIDELITY BRASS MANUFACTURING COMPANY, OF CHICAGO, ILLINOIS, A CORPORATION OF ILLINOIS.

AUTOGENOUS CUTTING-TORCH.

1,300,106.   Specification of Letters Patent.   Patented Apr. 8, 1919.

Application filed December 1, 1915. Serial No. 64,448.

*To all whom it may concern:*

Be it know that I, HARRY H. ARMSTRONG, a citizen of the United States, and residing at Chicago, county of Cook, and State of Illinois, have invented a certain new and useful Improvement in Autogenous Cutting-Torches, of which the following is a specification.

This invention relates to autogenous torches, and more particularly, to torches used for the cutting of metal.

In autogenous torches using oxygen and acetylene as a mixture, the flame is liable to flash back from various causes, owing to the high velocity of the propagation of flame in an oxy-acetylene mixture. Now the propagation of the flame can be retarded by keeping the walls of the mixture passages leading to the orifice cool, and by making these passages small, that is, by making them capillary passages.

Oxygen used for autogenous cutting is generally stored in tanks under very high pressure, and this pressure must, therefore, be reduced. Now this reduction of pressure causes a lowering of the temperature, so that the oxygen passing through the oxidizing tip is very cold. Now, since the cutting is accomplished by a combination of heating and oxidation, the action of the cool oxygen blast will cool, and, therefore, act to detract from the heating jet, thereby causing loss of efficiency. It has been attempted to overcome this by heating the tip, but that increases flash back troubles, as the decrease in the propagation of the flame requires that the heating gas passages be kept cool.

One of the objects of this invention, therefore, is to bring about an interchange of heat between the heating and oxidizing gases, so as to lower the temperature of the heating gas passages and raise the temperature of the oxygen gas, thereby concurrently preventing flash back and increasing the efficiency.

Another object is to provide an autogenous cutting torch in which the oxidizing tip forms a radiator and is constructed to form capillary passages for the heating gas.

Other objects are to provide a novel construction of mixing chamber and mixing orifice for said chamber, a novel construction of oxygen mixing nozzle which forms a radiator, and capillary passages, all constructed to prevent flash back.

Another object is to improve the construction of the torch as a whole, and further objects will appear from the detail description taken in connection with the accompanying drawing, in which:

Figure 1 is a plan of a cutting torch embodying this invention;

Fig. 2 is a section on the line 2—2, Fig. 1;

Fig. 3 is an enlarged detail perspective view of the oxidizing tip;

Fig. 4 is a detail perspective of the oxygen mixing nozzle;

Fig. 5 is an enlarged detail section of Fig. 2;

Fig. 6 is an enlarged section on the line 6—6, Fig. 2;

Fig. 7 is an enlarged section on the line 7—7, Fig. 2;

Fig. 8 is an enlarged section on the line 8—8, Fig. 2; and

Figs. 9, 10 and 11 are views similar to Fig. 7, but showing different forms of orifices for the heating gas.

Referring to the drawing, 1 designates a head which has mounted thereon a heating tip 2. Formed in this head is a mixing chamber 3, and mounted in the head is an oxidizing tip 4, the upper portion of the tip 4 being smaller in diameter than the interior of the head 1 and the mixing chamber 3 being the space therebetween. This oxidizing tip is arranged within the mixing chamber and the tip 2, and is provided with a thread 5 for detachably connecting the same with the head, the tip 2 having also a removable threaded connection with the head. This oxidizing tip has a reduced portion 6 coöperating with a reduced bore in the tip 2, and it will be seen that, while a space is formed between the mixing chamber walls and the oxidizing tip, the fit between the oxidizing tip and the tip 2 is snug, the tip 2 flaring to the mixing chamber, as shown at 7. The oxidizing tip is slotted longitudinally, as shown at 8, so as to form a plurality of capillary passages between the heating tip 2 and the oxidizing tip 4. These passages may extend the entire length of the enlarged portion of the oxidizing tip, as shown in Fig. 3, or only to the point where they make an entrance to the mixing chamber, as shown in Fig. 2, and they may only cover a sector of the tip 4, as shown in Figs. 2 and 3. The reduced portion 6 is cut away, as shown at 9, to form a gas outlet orifice between the tips, as shown in Fig. 6, and the shoulder between the enlarged and reduced portions of the oxidizing tip is cut away, as shown at 10, to form a passage connecting the orifice with the slots or capillary passages 8. The tip is provided with an oxygen passage 11, connecting with a passage 12 in the connection 13 on the head. The extreme end of the passage 11 is preferably contracted, as shown. As indicated above, the passages 8 are capillary passages, that is, their width is from one sixty-fourth ($\frac{1}{64}$) inch to one thirty-second ($\frac{1}{32}$) inch, depending upon their length, it being understood, of course, that the longer these passages are, the wider they can be made. The slots are cut so deep that only a thin wall remains between the bottoms of these slots and the passage 11.

The head has a connection 14 adapted to receive the gas pipe 15. Located within and extending longitudinally of the gas pipe is an oxygen pipe 16, which has formed on the end thereof a head 17 forming an oxygen nozzle 18 provided with a passage 19, which is restricted at its ends and enlarged at the center. The head 17 is slotted, as shown at 20, to form a series of capillary passages through which the gas from the gas pipe must pass. The slots or passages 20 are capillary passages, that is, they are made from one sixty-fourth ($\frac{1}{64}$) to one thirty-second ($\frac{1}{32}$) of an inch in width, depending upon their length, and these slots are cut comparatively deep. The entrance between the connection 14 and the mixing chamber is through a restricted passage 21, which flares at both ends to the mixing chamber and the connection 14 respectively.

The gas pipe 15 and the oxygen pipe 22 attached to the connection 13 make connections with a block 23 in any suitable manner, and this block in turn has a gas pipe connection 24 and an oxygen pipe connection 25 with the block 26 adapted for connection with the gas and oxygen supplies respectively, these pipes 24 and 25 being inclosed by a suitable casing 26ª, as is usual in torches of this construction. The gas pipe 24 is connected by a channel 27 to the gas pipe 15, a suitable asbestos screen 28 being interposed. The oxygen pipe 16 is connected by a channel 29 and a pipe 30 with the oxygen channel in the block 26. The oxygen pipe 25 is connected by suitable channels in the block 23 to the pipe 22, through a suitable valve comprising a spring pressed valve head 30ª mounted on a shank 31 and coöperating with a removable seat 32. The stem 31 passes through a gland 33, and is operated by a handle 34. A suitable screen 35, of asbestos or wire, is interposed in the oxygen channels.

The general operation of this torch will be obvious. The gas and oxygen are mixed at the oxygen nozzle, and pass into the mixing chamber, from whence the mixture is delivered through the passages 8 to the gas orifice between the tips to project a heating jet on the material to be cut, the outer tip 2 forming the heating tip. It will be understood, of course, that the gas and oxygen are controlled at the sources of supply. After the heating jet has been lighted, the oxygen valve is opened by the handle 34, so that an oxygen jet will be projected from passage 11. The torch can, therefore, be used for cutting in the usual manner.

The provision of the passages 8 in the oxidizing tip provides a radiator furnishing an enlarged surface between the heating gas and the oxidizing tip. Since the oxygen at a reduced pressure and low temperature is passing through the passage 11, the oxidizing tip will be cooled, and this will keep the heating gas in these passages 8 cool, and this cooling action will retard the propagation of the flame in the heating gas passages, so as to prevent flash back. Moreover, since the passages 8 are narrow, they will act as capillary passages so as to of themselves retard the propagation of the flame by the narrowness of the passages, and by breaking up the flame. Moreover, the close proximity of the oxidizing and heating gases will cause the temperature of the oxygen to be raised, so that it will issue at a higher temperature, thereby decreasing the cooling action on the metal to be cut, and thereby increasing the efficiency of the torch.

It will be noted that the orifice 21 between the mixing chamber and the connection is restricted, and that this orifice flares in both directions. This not only insures a more thorough mixing of the oxygen and the heating gas, but also prevents a flash back and the formation of a cutting flame at the nozzle 18 should a flash back take place, as the flaring of the orifice to the mixing chamber breaks up such a cutting jet. The provision of the slots or passages 20 in the head 17 provide a radiator which keeps the gases in these passages cool on account of the oxygen at reduced pressure passing through the central passage 19 in this head and nozzle, and thereby acts through this cooling action to prevent propagation of the flame in these passages 20. This, in connection with the formation of these passages 20 as capillary passages, effectually prevents flash back.

It will thus be seen that a torch is provided in which flash back is prevented in a series of places arranged in series, namely, in the tip, mixing chamber and mixing nozzle. Finally, the provision of the screens 28 and 35 furnishes additional protection in this respect. It will be noted that all of the mixing devices are arranged on the head of the torch, and that the block 23 only contains the controlling device for the oxygen. This not only renders the torch simple in construction, but also effective in its operation, accessible, and cheap to manufacture. The union connections between the pipes 15 and 22 to the block 23 provide means whereby the torch can be readily taken apart and packed in a small case.

In Figs. 9, 10 and 11 are shown different forms of orifices. Thus, in Fig. 9 the reduced portion 6 of the tip is squared so as to form four heating orifices adapted to deliver four jets surrounding the oxidizing orifice 11. In this construction, which is adapted to be used where the cutting is on a curved line, the passages 8 preferably extend in a complete circle around the oxidizing tip. Fig. 10 shows an orifice formed of three cut away portions, similar to 9. Fig. 11 shows still another form of orifice. In all three of these forms the slots or passages 8 in the tip will be formed to correspond to the orifices.

It is obvious that various changes may be made in the details of construction without departing from the spirit of this invention. It is, therefore, to be understood that this invention is not to be limited to the specific construction shown and described.

Having thus described the invention, what is claimed is:

1. An autogenous torch comprising a head having a heating tip, and an oxidizing tip arranged within said heating tip to form therewith a heating gas orifice, said oxidizing tip having a reduced portion snugly fitting said heating tip, the portion of said oxidizing tip above said reduced portion being provided on its outer periphery above said reduced portion with a plurality of deep narrow longitudinal slits forming capillary heating gas passages constructed and arranged to form a radiator, adapted to cool the heating gas and heat the oxidizing gas.

2. An autogenous torch comprising a head having a heating tip, and an oxidizing tip arranged within said heating tip, said oxidizing tip having a reduced portion snugly fitting said heating tip, the portion of said oxidizing tip above said reduced portion provided on its outer periphery with a plurality of deep narrow longitudinal slits forming capillary heating gas passages between said tips, substantially as and for the purpose set forth.

3. An autogenous torch comprising a head having a heating tip, and an oxidizing tip arranged within said heating tip, said oxidizing tip being formed with a reduced portion snugly fitting said heating tip, the portion of said oxidizing tip above said reduced portion being provided on its outer periphery with a series of deep narrow longitudinal slits forming a plurality of capillary heating gas passages between said tips, said oxidizing tip being adapted to form a radiator to cool the heating gas and heat the oxidizing gas.

4. An autogenous torch comprising a head having a heating tip, and an oxidizing tip arranged within said heating tip, said tips being formed to provide a sector heating gas orifice, and said oxidizing tip having a reduced portion snugly fitting said heating tip, the portion of said oxidizing tip above said reduced portion being provided on its outer periphery with a series of deep narrow longitudinal slits forming a series of longitudinal capillary heating gas passages between said tips and discharging to said orifice.

In testimony whereof I affix my signature this 22nd day of October, 1915.

HARRY H. ARMSTRONG.